Figure 1:
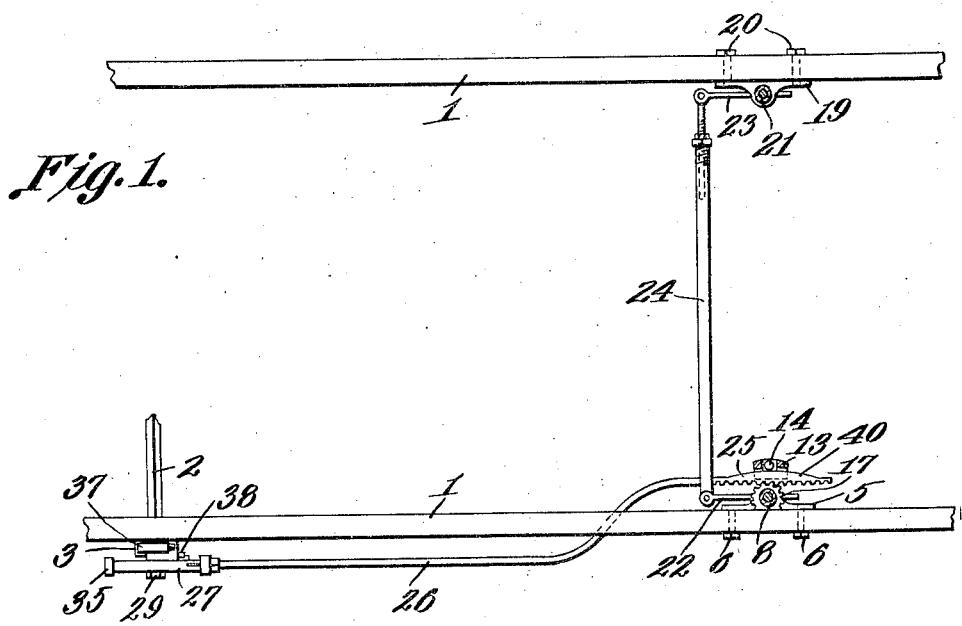

L. J. WOGENSTAHL.
LAMP OPERATING MECHANISM.
APPLICATION FILED MAY 6, 1913.

1,078,115.

Patented Nov. 11, 1913.

2 SHEETS—SHEET 1.

Leo J. Wogenstahl,
Inventor

Witnesses by C. A. Snow & Co.
Attorneys

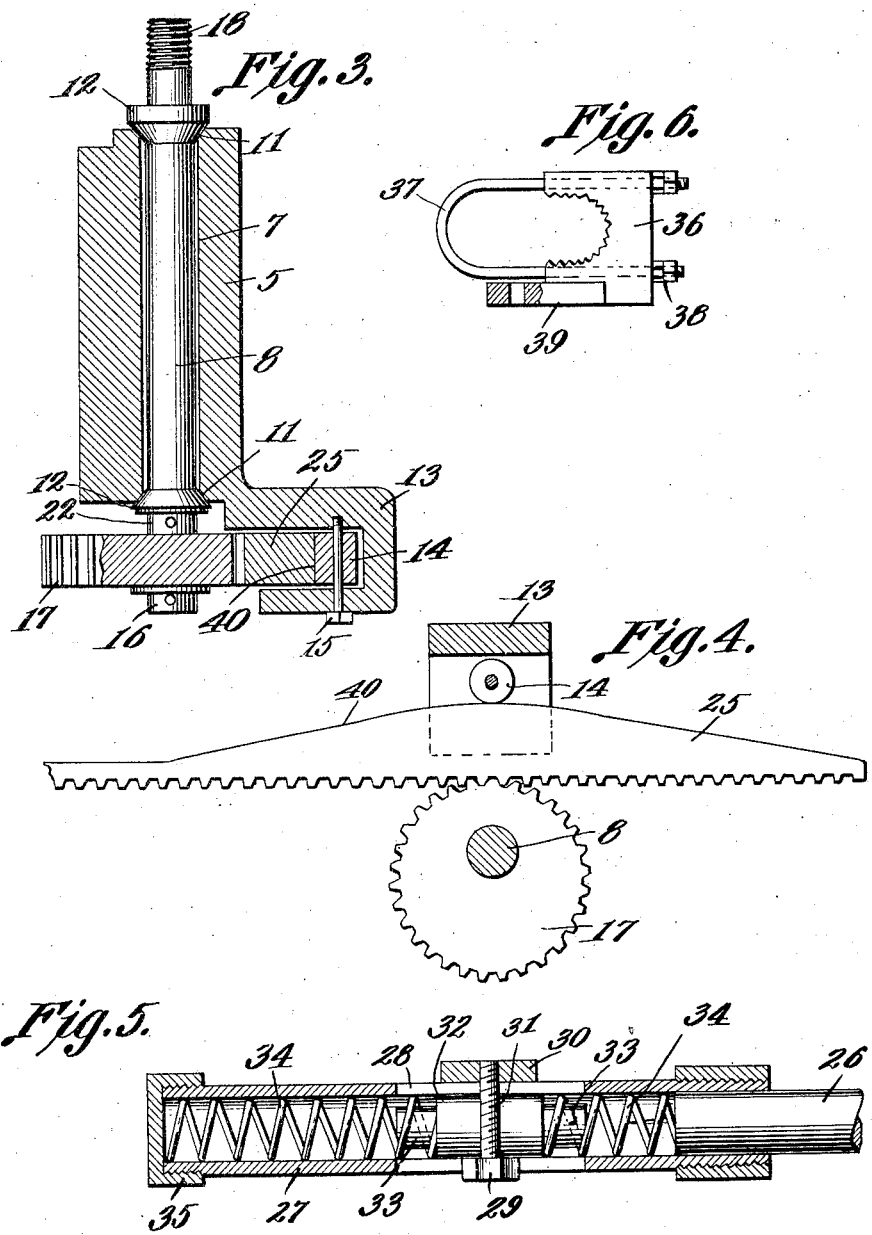

UNITED STATES PATENT OFFICE.

LEO J. WOGENSTAHL, OF SAN ANTONIO, TEXAS.

LAMP-OPERATING MECHANISM.

1,078,115.   Specification of Letters Patent.   Patented Nov. 11, 1913.

Application filed May 6, 1913. Serial No. 765,834.

*To all whom it may concern:*

Be it known that I, LEO J. WOGENSTAHL, a citizen of the United States, residing at San Antonio, in the county of Bexar and State of Texas, have invented a new and useful Lamp - Operating Mechanism, of which the following is a specification.

This invention relates to improvements in mechanism for turning the lamps of an automobile.

An object of the present invention is to provide means whereby the lamps are simultaneously turned with and by the front wheels.
Another object of the present invention is to provide a mechanism for the turning of automobile lamps wherein the velocity of rotation during the initial phases will be relatively greater than the velocity of rotation during the final phases.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 2:
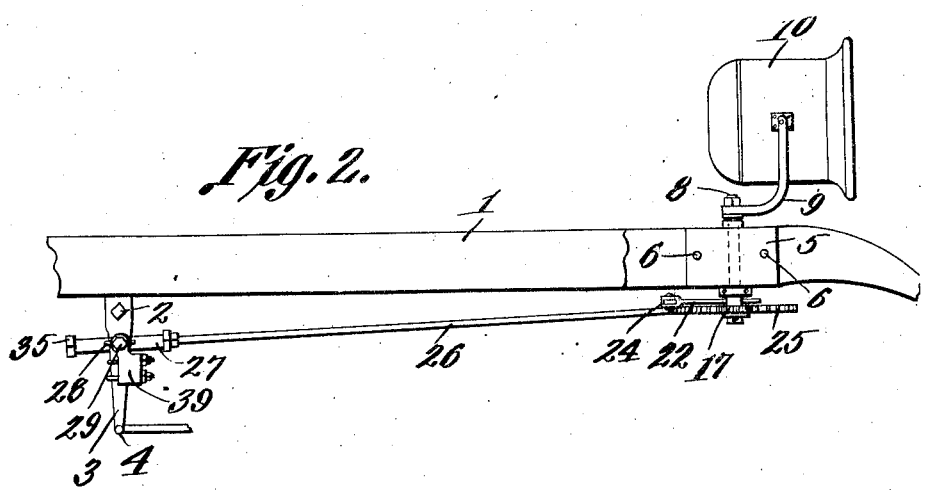

Figure 1 is a plan view illustrating the manner in which the two lamps are simultaneously controlled and the manner in which the rotation thereof is secured by connecting the same to the steering gear. Fig. 2 is a side view of the same. Fig. 3 is a cross sectional view through the lamp supporting pivot and the rack and gear secured thereto. Fig. 4 is a detail view of the gear and the actuating rack therefor. Fig. 5 represents the manner in which the rack rod is secured to the steering gear. Fig. 6 is a detail view of the rack bar securing means which is adapted to engage the steering gear. Fig. 7 is a view of a modified form in which the elliptical or eccentric gear and rack are dispensed with and a crank arm substituted therefor.

Referring to the drawings in which similar reference numerals designate corresponding parts throughout the several views, 1 is the metallic frame of an automobile and 2 is a portion of the steering gear shaft. The steering gear shaft 2 is provided with the usual depending arm 3 to the lower extremity 4 of which the connecting rod to the front wheels is secured.

In order that the lamps may be mounted for rotative movement a base plate 5 is rigidly secured to the metallic frame 1 by suitable securing bolts 6 passing therethrough. The said base plate 5 is provided with an aperture 7 extending therethrough extending through which aperture is a spindle 8 to the upper extremity of which is rigidly secured the lamp supporting bracket 9 to which the lamp 10 is rigidly secured.

The base plate 5 as illustrated in cross section in Fig. 3 of the drawings is provided with the conical bearing seats 11 at the upper and lower extremities of the aperture 7. The spindle 8 is provided with the conical bearing members 12 which are rigidly secured to the said spindle and are adapted to engage the said conical bearing seats and form an efficient bearing therewith, it being noted that suitable anti-frictional means may be disposed between the conical bearing members and seats if so desired. Formed integral with the lower extremity of the base plate 5 is the downwardly projecting casing 13 which casing is provided with a roller 14 disposed near the inner extremity thereof which roller is mounted for rotation upon a pivot 15 which extends through the side walls of the casing 13 and threadedly engages the upper portion thereof. The lower extremity of the spindle 8 is threaded as at 16 to which threaded portion is rigidly secured a gear wheel 17, said gear wheel being secured to the said spindle so that it will lie directly in front of the casing 13. The upper extremity of the spindle 8 is threaded as at 18 the same affording means whereby the lamp supporting bracket 9 may be rigidly secured by said spindle and rotated therewith.

The base plate just described is rigidly secured to one member of the metallic frame and is adapted to support one of the lamps. Rigidly secured to the opposite metallic frame member is a somewhat similar base plate 19, which is rigidly secured thereto by means of the bolts 20. The construction of the base plate 19 is exactly similar to that of the base plate 5 with the exception that the casing 13 is omitted. A spindle 21 extends through the base plate 19 and has secured to the upper extremity thereof a lamp supporting bracket and lamp. In order that the spindles 8 and 21 may be simultaneously rotated, an actuating arm 22 is rigidly secured to the spindle 8 between the gear wheel 17 and conical bearing member 11 and a similar actuating arm 23 is rigidly secured to the spindle 21, to the outer extremities of which arms 22 and 23 is pivotally secured the extensible link 24, by which means it will be apparent that a rotation of the spindle 8 will produce a corresponding rotation of the spindle 21 to thereby effect the simultaneous shifting or rotating of the lamps. A rack bar 25 fits within the casing 13 and is adapted to engage the spur gear 17 and the roller 14. Rigidly secured to the rack rod 25 or formed integral therewith is the rod 26 to which is secured the hollow cylinder 27 shown in cross section in Fig. 5. The side walls of the cylinder 27 are provided with slots 28 through which extends a bolt 29, the said bolt being provided with a suitable nut 30 secured thereto in such a manner that the cylindrical walls are clamped between the head of the bolt and the nut. The said bolt 29 extends through an aperture 31 formed in a plunger 32, the said plunger being provided with the forwardly and rearwardly projecting lugs 33 which have secured thereto the resilient springs 34 the rear one of which is held in place by means of the rear cap 35 and the front one being disposed between the end of the rod 26 and the plunger 32. In order that the plunger 32 may be rigidly secured to the steering gear actuating arm 3, the clamping member as illustrated in Fig. 6 of the drawings is provided, the same comprising the bifurcated body portion 36 to which are secured the U-shaped bolts 37. Suitable tightening means 38 are adjustably secured thereto. The said steering gear actuating arm 3 is rigidly clamped between said U-shaped bolts 37 and the bifurcated 36 and to one extremity of the member 36 is formed the integral upstanding portion 39, the extremity of which forms the nut 30.

From the foregoing it will be apparent that the steering gear actuating arm 3 is adapted to simultaneously rotate the automobile lamps and also that .e excessive vibration and jar to which the a m 3 is subject will not be transmitted to the said lamps but will be taken up by the resilient spring members 34.

In order that the angular movement of the lamps with respect to the central position thereof will decrease with corresponding turning of the front wheels of the vehicle the spur gear wheel 17 is illustrated in Fig. 4 of the drawing as being mounted eccentrically and in order for the rack rod 25 to remain in contact therewith and with the roller 14, the inner peripheral edge 40 thereof is a curve plotted with rectangular coördinates equal to the polar coördinates which would produce the peripheral surface of the gear wheel 17, from which it will be apparent that when the rack rod 25 is shifted the peripheral edge 40 thereof will remain in constant contact with the roller 14 and the opposite edge will remain in mesh with the gear wheel 17. The exact contour of the gear wheel 17 is immaterial it being noted that the same may be circular, elliptical or of other form whereby the ratio of the angular movement of the spur gear wheel with relation to the rectilinear motion of the rack rod 25 will vary. From the foregoing it will be apparent that when the front wheels of the vehicle are slightly turned the lamps will be sharply turned and no matter how sharp the turn the lamps will illuminate the same.

The modified form as illustrated in Fig. 7 shows a crank arm 17' rigidly secured to the spindle 8 in place of the eccentric gear 17.

Having thus described the invention what I claim to be new and original with me is:—

1. In a lamp shifting mechanism, the combination of a steering gear mechanism, a lamp carrying spindle, a spur gear wheel rigidly secured thereto and mounted eccentrically thereof, a rack bar adapted to engage the spur gear wheel, means connecting the said steering gear with the said rack bar for the positive motion of the latter by and with the former, the outer edge of said rack bar being formed as a curve representing the rectilinear development of the curvature of the periphery of said spur gear taken with respect to its eccentric axis, and a roller the axis thereof fixed with respect to the axis of the spur gear and adapted to continuously contact with the outer edge of said rack bar.

2. In a lamp operating mechanism, the combination of a spindle adapted to support a lamp, a spur gear wheel rigidly secured thereto and mounted eccentrically thereof, a casing with a roller therein, a rack bar disposed within said casing engaging said roller and adapted to mesh with and positively drive said spur gear wheel, and the outer edge of said rack bar adapted to conform with the eccentricity of said gear wheel to maintain the same in contact with said roller and to mesh with said gear wheel.

3. In a lamp rotating mechanism, the combination of a base plate adapted to be rigidly secured to a vehicle frame, a spindle journaled for rotation therein, said spindle adapted to rigidly support a lamp, a casing formed integral with the said base plate and extending therefrom, a roller disposed within said casing, a spur gear rigidly secured to said spindle and of varying radii, a rack bar adapted to mesh with and actuate said spur gear, and said rack bar provided with an outer edge adapted to continuously engage said roller to thereby hold said rack bar and spur gear in mesh, and means for actuating said rack bar simultaneously with the shifting of the vehicle wheels.

4. The combination with a vehicle frame, of base plates rigidly secured thereto, spindles rotatably supported thereby, and adapted to support lamps, outstanding arms rigidly secured to the spindles and a link connection therebetween for the simultaneous rotation of said spindles, one of said spindles provided with an eccentrically mounted spur gear secured thereto, and a rack bar adapted to mesh with said spur gear, means for holding the same in contact therewith, and means for resiliently connecting said rack bar with the steering gear mechanism.

5. The combination with a vehicle frame, of base plates rigidly secured thereto, spindles rotatably supported thereby and adapted to support lamps, outstanding arms rigidly secured to the spindles and a link connection therebetween for the simultaneous rotation of said spindles, one of said spindles provided with an eccentrically mounted spur gear secured thereto, and a rack bar adapted to mesh with said spur gear, and means for resiliently connecting said rack bar with the steering gear mechanism.

In testimony that I claim the foregoing as my own, I have hereto affixed my signature in the presence of two witnesses.

LEO J. WOGENSTAHI

Witnesses:
H. L. GOSLING,
M. I. McILHENNY.